No. 618,864. Patented Feb. 7, 1899.
H. S. GRABER.
APPARATUS FOR OPERATING ELECTRIC BRAKES.
(Application filed July 25, 1898.)
(No Model.)
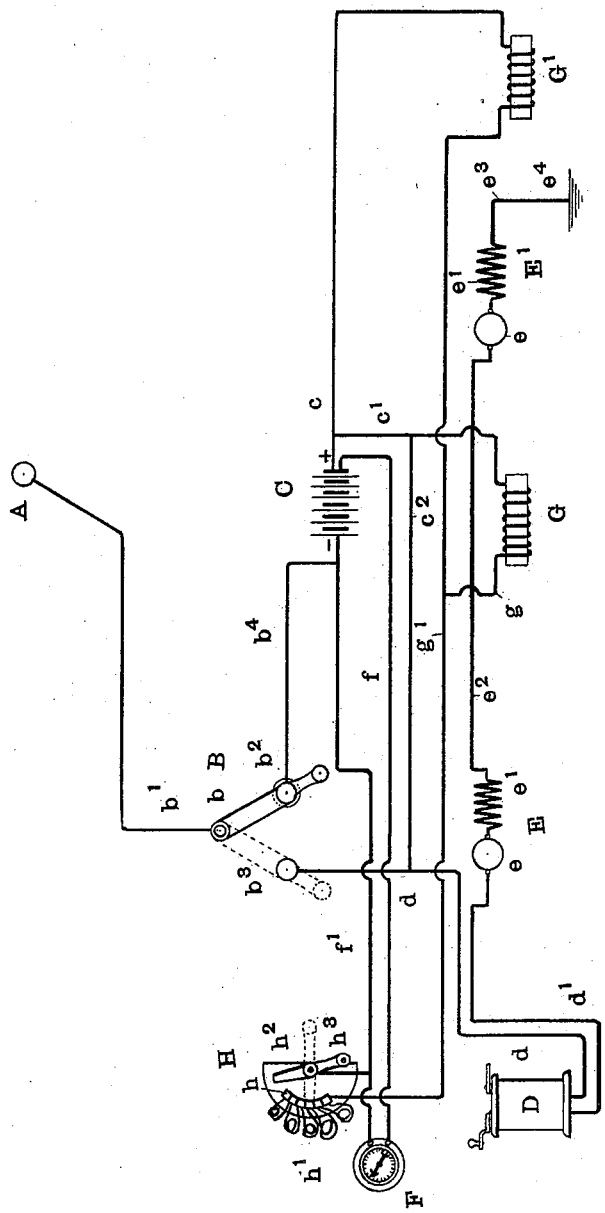
Attest
W. H. Alexander
T. C. Witherspoon
Inventor:-
Herman S. Graber
By Benj. J. Rex
Atty.

UNITED STATES PATENT OFFICE.

HERMAN S. GRABER, OF ST. LOUIS, MISSOURI.

APPARATUS FOR OPERATING ELECTRIC BRAKES.

SPECIFICATION forming part of Letters Patent No. 618,864, dated February 7, 1899.

Application filed July 25, 1898. Serial No. 686,755. (No model.)

*To all whom it may concern:*

Be it known that I, HERMAN S. GRABER, a citizen of the United States, residing at St. Louis, in the State of Missouri, have invented a new and useful Apparatus for Operating Electric Brakes and Analogous Devices, of which the following is a specification.

My invention relates chiefly to improvements in means for supplying electric motive power to electric brakes on cars propelled by electric motors receiving their power from a stationary source of supply through a trolley or other suitable device; and the main objects of my improvements are, first, to provide means for supplying electromotive force to brake-magnets in such a way that it will be available for use at all times and will not vary materially in strength; second, to provide means for supplying the brake-magnets with electromotive force which can be either cut out of the motor-circuit or switched into it and which will not affect the operation of the motors when out of order; third, to provide cheap and simple means for supplying brake-magnets with electromotive force which can be applied to cars now in use without any change in the wiring of the motors or any substantial change in the present car-wiring, except a few simple additions to the latter; fourth, to avoid the expense of using either high-resistance brake-magnet coils or expensive resistance-boxes; fifth, to provide means available for supplying electromotive force not only to the brake-magnets of a motor-car, but also those of a trailer; sixth, to provide means for supplying brake-magnets with electromotive force which can be applied to any car regardless either of its weight or the number of motors used; seventh, to provide an apparatus for supplying electromotive force which can be used with any form of electromagnet or brake and which will not require any special form of brake-shoe, and, eighth, to provide improved means for charging a storage battery for supplying electromotive force to brakes or analogous devices from the motor-circuit while the motors are in use. I attain these objects by means of an apparatus whose preferred form is illustrated in the accompanying drawing, showing a diagrammatic view thereof, with the brake-circuit open, and a storage battery for supplying brake-magnets with electromotive force, receiving current from a trolley.

In my drawing, A represents a trolley. B is a switch having a lever $b$ connected with the trolley by a conductor $b'$ and provided with contacts $b^2$ and $b^3$. The lever is shown in full lines on the contact $b^2$ and in dotted lines in the contact $b^3$. The switch-lever may either be moved by hand or operated by means of a suitable automatic device. (Not shown.) From the contact $b^2$ a conductor $b^4$ runs to a storage battery C, preferably one having only a few cells and presenting a comparatively small resistance to a current flowing through it. This battery is connected by conductors $c$, $c'$, $c^2$, and $d$ with a motor-controller D, of common form, and from this motor-controller a conductor $d'$ leads to an electric motor E, from which a conductor $e^2$ leads to a motor E', from which a conductor $e^3$ leads, which is shown grounded at $e^4$. The form of the return-circuit is, however, immaterial.

The motors are each shown provided with an armature $e$ and a field-magnet coil $e'$. The form and size of the motors and the winding of their respective armatures and field-coils are alike immaterial so far as my invention is concerned.

I have shown two electric motors arranged in series with the storage battery; but any number from one up may be used.

While the battery C is being charged, the current flows from the trolley to the switch B, thence to the battery C, thence to the motor-controller D, and thence to the motors.

In consequence of the motors being arranged in series with the storage battery their coils furnish the resistance necessary to enable the small storage battery used to be charged from the motor-circuit and enable me to dispense with the expensive resistance-coils which would otherwise be necessary.

In order to enable an operator to ascertain at any time the condition of the battery C, I preferably connect a voltmeter F, of common form, therewith by means of conductors $f$ and $f'$ and $b^4$ or in any other usual way. When the storage battery is fully charged, the switch-lever B is preferably moved from contact $b^2$ to contact $b^3$ and the storage battery in that way cut out of the motor-circuit. The trolley-current then flows, in the apparatus shown, direct from the switch to the motor-controller D through the conductor $d$ and from the motor-controller to the motors.

The battery C may be used for energizing the electromagnets of any desired number of brakes, and there is no difficulty in using it to supply electromotive force to the brake-magnet of a trailer, as well as the brake-magnets of the motor-car. In the drawing, G represents the electromagnet for operating the motor-car brake, and G' the trailer brake-magnet. As will be obvious, the form of the electric brake used and the form of electromagnet used in connection therewith are alike immaterial.

The coil of the brake-magnet G is shown connected with the battery C by means of conductors $c$ and $c'$, and said coil is connected through conductors $g$ and $g'$ with a multipoint resistance-switch H, of common form. The one shown is provided with contacts $h$, resistance-coils $h'$, and a lever $h^2$; but any other of the known forms of switch adapted to furnish a variable resistance will answer equally well. The switch-lever $h^2$ is shown connected with the conductor $f'$ by means of a conductor $h^3$.

The coil of the trailer brake-magnet G' is shown connected with the battery C by means of the conductor $c$ and with the switch H by the conductor $g'$. In the arrangement shown both brakes are set at once; but that is a non-essential feature. Neither is it essential that they be arranged in multiple arc, as shown. The brakes may be set by moving the lever $h^2$ of the switch H so as to close the circuit. The battery-current then flows to the coil of the magnet G through the conductors $c$ and $c'$, then passes to the switch H through the conductors $g$ and $g'$, and then back to the battery C through conductors $h^3$, $f'$, and $b^4$, and at the same time another portion of the battery-current flows to the coil of brake-magnet G' through the conductor $c$ and passes from said coil to the switch along the conductor $g'$ and from the switch follows the same course back to the battery as the portion of the current which has passed through the coil of the magnet G.

As will be obvious, the course of the current is immaterial. The result would be the same if the course described were reversed.

In using my apparatus the brakes may be applied when the battery is being charged as well as when it is not in the motor-circuit. In the former case the battery-current goes to the brake magnet or magnets and pursues the same course as it does when the battery is not being charged, while that portion of the trolley-current which leaves the battery C passes to the motors if the motor-circuit is closed. When, however, the motors are cut out of circuit before the brakes are applied, as they should be, the trolley-current will substantially cease flowing through the battery C until the motors are thrown in circuit again.

A multipoint resistance-switch for use in connection with the brakes is desirable, for the reason that it enables the operator to control the strength of the brake-magnets in a convenient manner; but that may be done in other known ways, and a resistance-switch is not absolutely essential.

By reason of its simplicity my apparatus is cheap and not liable to get out of order, and it can be readily applied to any of the electric cars in use and can be used in connection with any of the electromagnetic brakes with which I am acquainted.

I have shown one method of wiring my apparatus and arranging the parts thereof; but any other suitable wiring and arrangement of parts may be used. I do not confine my claims to the particular arrangement illustrated.

I claim—

1. The combination of a storage battery; an electric motor; a charging, and motor-operating, circuit, in which they are arranged in series; an electromagnet permanently out of circuit with the motor; a second circuit receiving no electricity from the first circuit, and in which said battery, and magnet are arranged; and means for opening and closing the second circuit.

2. The combination of a storage battery; an electric motor; an electric circuit in which they are arranged in series; an electromagnet; a rheostat and a second electric circuit in which said battery-magnet and rheostat are arranged, and through which no electricity from the first circuit flows.

3. The combination of a storage battery; an electric motor; an electric circuit in which said battery and motor are arranged in series; an electromagnet permanently out of circuit with the motor; a switch; and a second electric circuit in which said battery, switch, and magnet are arranged, and through which no electricity from the first circuit flows.

4. The combination of a storage battery; an electric motor; a circuit in which they are arranged in series; a second circuit leading to and from said battery and which receives no electricity from said first circuit; a series of electromagnets permanently out of circuit with the motor arranged in said second circuit and means for opening and closing the latter circuit.

5. The combination of a trolley, a storage battery; a series of electromagnets; an electric motor; a motor-controller; a switch having two contacts, and means for electrically connecting either contact with the trolley; means electrically connecting one contact of said switch with the motor-controller, and the other with said storage battery; means connecting said storage battery with said motor-controller; means electrically connecting the motors with said controller and also with a return-circuit; another circuit in which said battery and said electromagnets are arranged and which receives no electricity from the trolley-circuit; and, means for opening and closing the latter circuit.

6. The combination of an electric motor, a motor-circuit; a storage battery arranged in said circuit in series with the motor; means for cutting said battery out of said circuit and switching it in again; a second circuit leading to and from said battery and receiving no electricity from the motor-circuit; and an electromagnet and resistance-switch arranged in said second circuit.

7. The combination of an electric circuit; a trolley, a series of electric motors, and a storage battery, arranged in said circuit, in series with the motors; means for switching said battery in and out of said circuit; a second circuit leading to and from said battery and receiving no electricity from the motor-circuit; an electromagnet permanently out of circuit with the motors; and arranged in the battery-circuit and means for switching said battery in and out of circuit.

8. The combination of an electric circuit; a storage battery; and a series of electric motors arranged in said circuit in series; means for cutting the battery out of the motor-circuit; a second circuit leading to and from said battery and receiving no electricity therefrom; a series of electromagnets arranged in said circuit and permanently out of circuit with the motors and means for switching said magnets into and out of circuit.

9. The combination of a source of electricity; a storage battery; an electric motor; an electric circuit in which they are arranged in series, and through which said battery is charged; an electromagnet permanently out of circuit with the motor; and a second electric circuit receiving no electricity from the first, and in which said battery, and magnet are arranged, and through which alone, said electromagnet is energized.

HERMAN S. GRABER.

Witnesses:
   T. C. WITHERSPOON,
   BENJ. F. REX.